United States Patent
Desjoyeaux et al.

(10) Patent No.: US 11,867,073 B2
(45) Date of Patent: Jan. 9, 2024

(54) PART HAVING IMPROVED ABRASION RESISTANCE

(71) Applicant: SAFRAN NACELLES, Gonfreville l'Orcher (FR)

(72) Inventors: Bertrand Léon Marie Desjoyeaux, Moissy-Cramayel (FR); Mathieu François Eric Preau, Moissy-Cramayel (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 0 days.

(21) Appl. No.: 17/774,340

(22) PCT Filed: Nov. 4, 2020

(86) PCT No.: PCT/FR2020/051993
§ 371 (c)(1),
(2) Date: May 4, 2022

(87) PCT Pub. No.: WO2021/094672
PCT Pub. Date: May 20, 2021

(65) Prior Publication Data
US 2022/0403754 A1  Dec. 22, 2022

(30) Foreign Application Priority Data
Nov. 12, 2019 (FR) .......................... 1912610

(51) Int. Cl.
*F01D 25/00* (2006.01)
*F01D 25/24* (2006.01)
(Continued)

(52) U.S. Cl.
CPC .......... *F01D 25/005* (2013.01); *F01D 25/24* (2013.01); *F05D 2230/31* (2013.01);
(Continued)

(58) Field of Classification Search
CPC ... B29C 70/74; F01D 25/005; B29K 2727/18; B29K 2427/18; F05D 2300/432; F05D 2300/603
See application file for complete search history.

(56) References Cited

U.S. PATENT DOCUMENTS 5,839,551 A    11/1998  Cesaraccio et al.
2004/0213492 A1  10/2004  Kim et al.
(Continued)

OTHER PUBLICATIONS

International Search Report as issued in International Patent Application No. PCT/FR2020/051993, dated Feb. 19, 2021.

*Primary Examiner* — David E Sosnowski
*Assistant Examiner* — Maxime M Adjagbe
(74) *Attorney, Agent, or Firm* — Pillsbury Winthrop Shaw Pittman LLP

(57) ABSTRACT

An assembly includes a first part and a second part separate from the first part, the first and second parts being intended to be in frictional contact, the first part being made of an organic matrix composite material that has, on its surface, an abrasion-resistant area including a resin that contains polytetrafluoroethylene particles, the polytetrafluoroethylene particles being only present at the surface of the first part, and the second part being made of an organic matrix composite material and being in contact with the abrasion-resistant area of the first part.

11 Claims, 6 Drawing Sheets

(52) U.S. Cl.
CPC .... *F05D 2240/14* (2013.01); *F05D 2300/432* (2013.01); *F05D 2300/603* (2013.01); *F05D 2300/615* (2013.01)

(56) References Cited

U.S. PATENT DOCUMENTS

2009/0297828 A1* 12/2009 Shenderova ............ A61K 8/30
                                                          428/323
2011/0002779 A1   1/2011 Schuster
2017/0328393 A1* 11/2017 Lamouche ........... F16B 5/0685
2018/0258241 A1   9/2018 Zia et al.

\* cited by examiner

[Fig. 1]
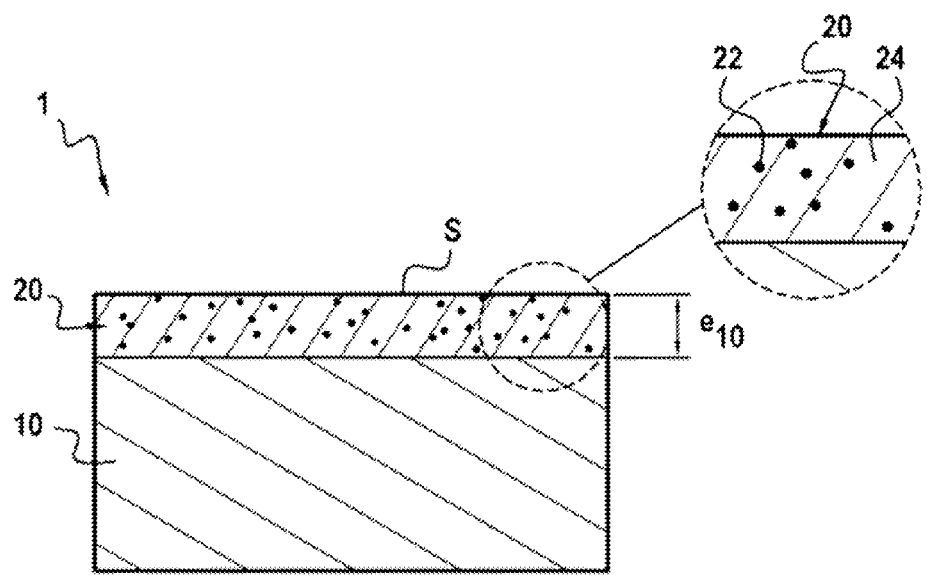
[Fig. 2]
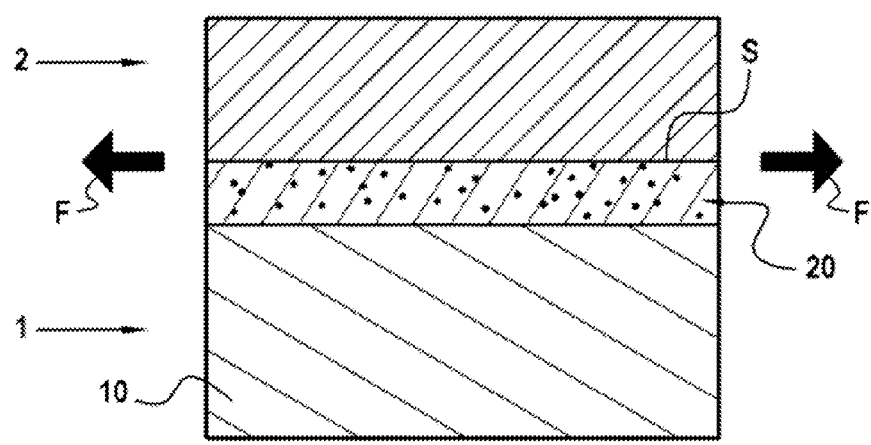

[Fig. 3]
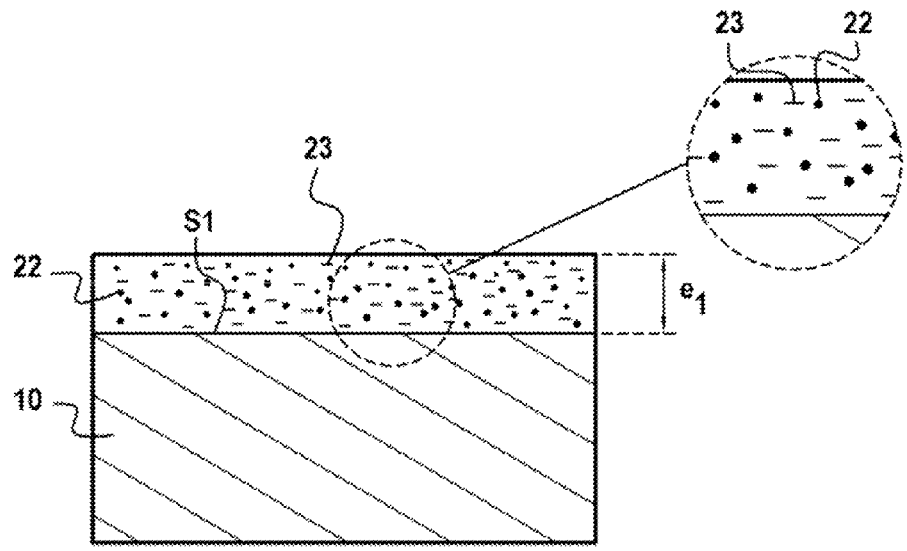
[Fig. 4]
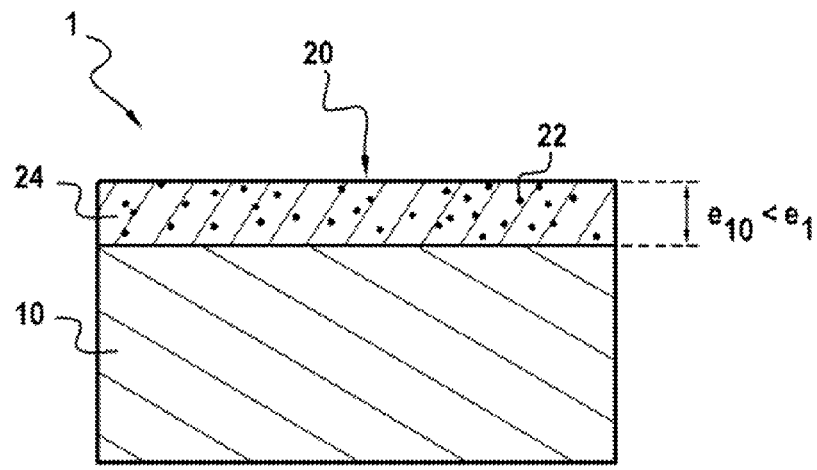

[Fig. 5]
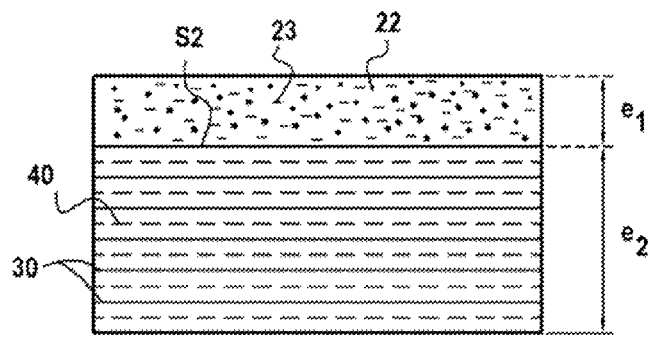
[Fig. 6]
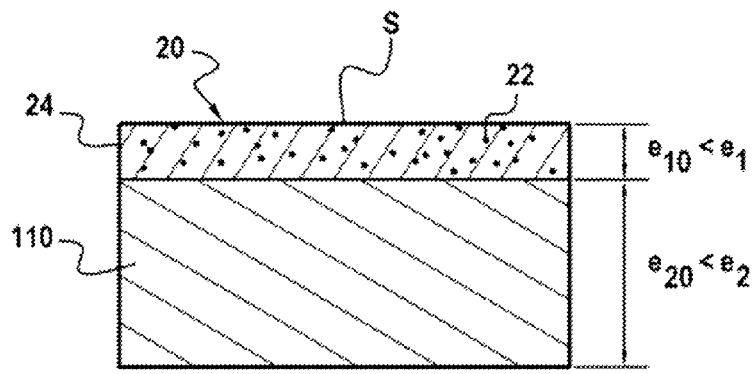
[Fig. 7]
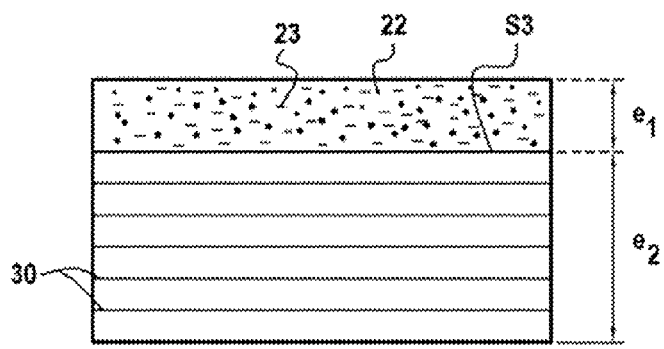

[Fig. 8]
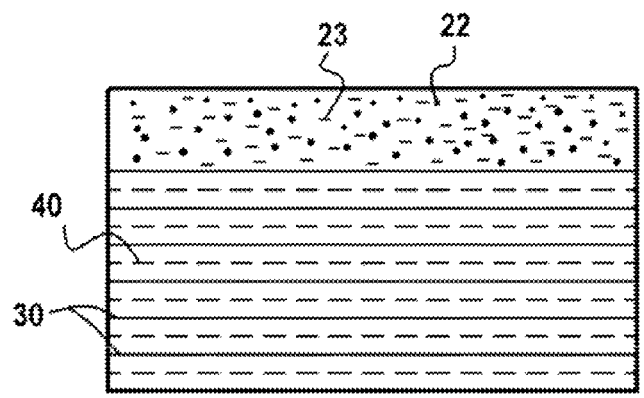
[Fig. 9]
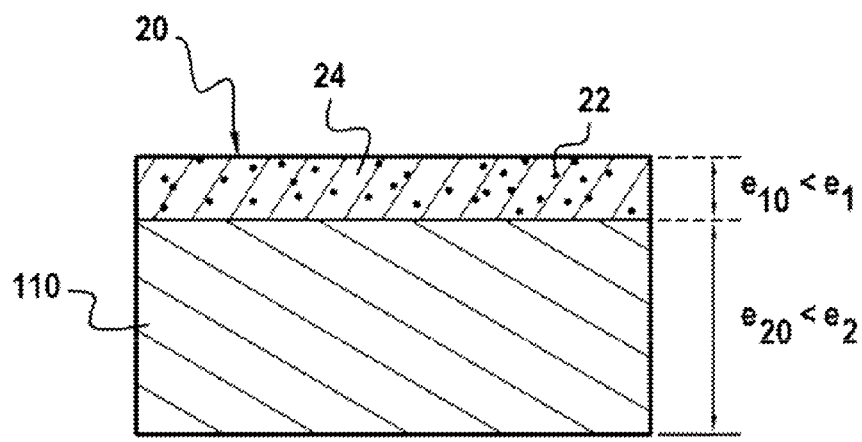

[Fig. 10]
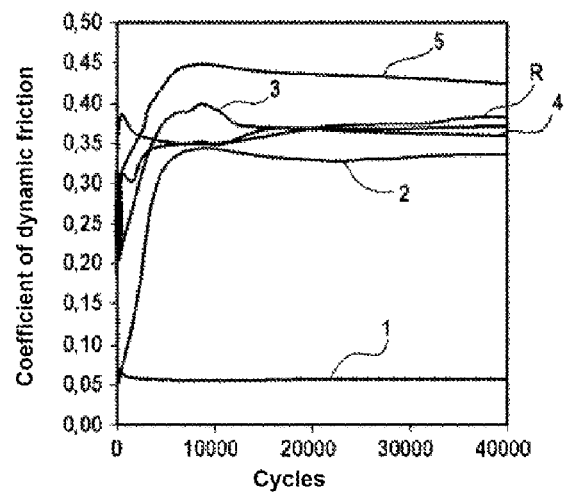
[Fig. 11]
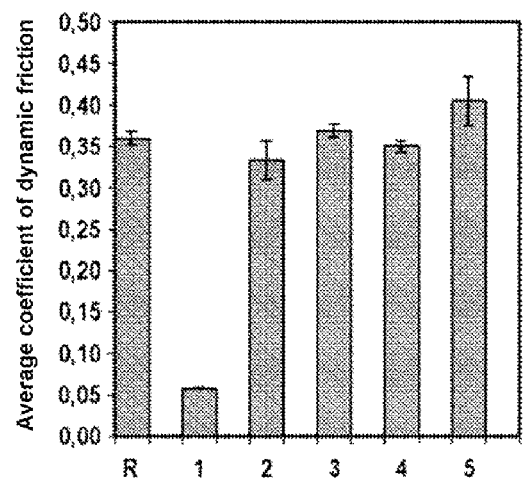

[Fig. 12]
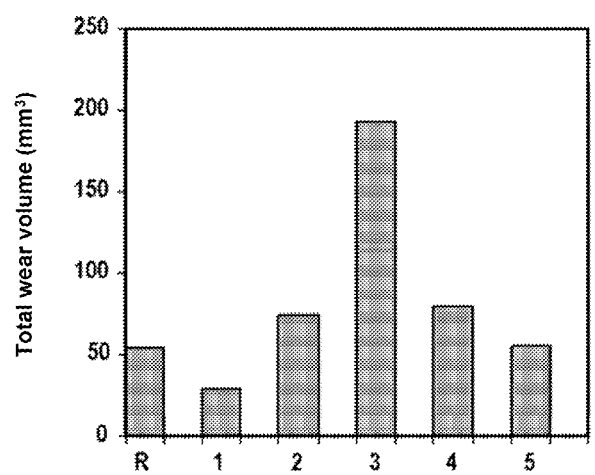

PART HAVING IMPROVED ABRASION RESISTANCE

CROSS-REFERENCE TO RELATED APPLICATIONS

This application is the U.S. National Stage of PCT/FR2020/051993, filed Nov. 4, 2020, which in turn claims priority to French patent application number 1912610 filed Nov. 12, 2019. The content of these applications are incorporated herein by reference in their entireties.

TECHNICAL FIELD

The present invention relates to a part made of organic matrix composite material ("Organic Matrix Composite"; "OMC") having an improved abrasion resistance, and to the manufacture of this part.

PRIOR ART

Organic matrix composites are often used under conditions where parts are in frictional contact with one another. The coefficients of friction of the usual matrices of structural composites with organic thermosetting or thermoplastic matrices are relatively high. The contacts and fictions encountered in operation can generate significant heating and wear.

It is known to incorporate carbon fillers in polymer bases, but, even with this solution, the coefficient of friction of the part obtained can remain high. The abrasion resistance provided by this solution can therefore be further improved.

Consequently, it is desirable to have solutions for improving the abrasion resistance of parts made of organic matrix composite material, while retaining a simple manufacture of these parts and without leading to an increase in their bulk.

DISCLOSURE OF THE INVENTION

The present invention relates to a part made of an organic matrix composite material that has, on its surface, an abrasion-resistant area comprising a resin that contains polytetrafluoroethylene particles.

The abrasion-resistant area of the part according to the invention has a reduced coefficient of dynamic friction and provides the part with a significant improvement in abrasion resistance compared to the incorporation of carbon filters proposed in the prior art. In addition, the solution according to the invention makes it possible to retain a relatively simple manufacture for the part and does not cause it additional bulk, the geometry and the dimensions of the part not being significantly changed.

In particular, the invention makes it possible to dispense with the use of a metal wear element added and assembled by bonding to the part, that solution being able to lead to more complex manufacture and to differential expansions not accommodated in operation.

In an exemplary embodiment, the mass content of polytetrafluoroethylene particles in the abrasion-resistant area is between 5% and 65%, for example between 10% and 60%.

Such contents participate advantageously in further improving the abrasion resistance while avoiding any risk of altering the properties of the composite material part.

In an exemplary embodiment, the median size of the polytetrafluoroethylene particles is between 0.1 µm and 50 µm, or even between 0.5 µm and 50 µm or between 0.1 µm and 10 µm, or even between 0.5 µm and 5 µm.

Unless otherwise stated, "median size" shall mean the dimension given by the is statistical particle size distribution to half of the population, referred to as D50.

In an exemplary embodiment, the part is a turbomachine part, for example an aeronautical turbomachine part. The part can, for example, be a moving cowl of a thrust reverser ("transcowl") or a cowl of a fan ("fancowl").

The invention also relates to an assembly comprising a first part as described above and a second part, separate from the first part, in contact with the abrasion-resistant area of the first part.

During use, the first and second parts are intended to be in frictional contact with one another on the abrasion-resistant area. According to one example, the second part can have a structure as described above, in other words can be made of an organic matrix composite material and have, on its surface, a second abrasion-resistant area comprising a second resin that contains second polytetrafluoroethylene particles, the abrasion-resistant area of the first part being in contact with the second abrasion-resistant area.

The invention also relates to a turbomachine comprising an assembly as described above.

The invention also relates to a method for manufacturing a part as described above, comprising at least:
  forming, on the surface of a substrate made of organic matrix composite material, a layer comprising the resin in the fluid state and the polytetrafluoroethylene particles, and
  curing the resin in the fluid state on the substrate in order to form the abrasion-resistant area and to obtain the composite material part.

A surface treatment, that is known per se, of the substrate can also be performed before forming the layer comprising the resin in the fluid state and the polytetrafluoroethylene particles. According to one example, a fibrous texture and optionally an adhesive can be positioned on the substrate before forming said layer on top.

Alternatively and according to a first embodiment, the method is a method for manufacturing a part such as described above, comprising at least:
  forming, on the surface of a fibrous structure pre-impregnated with a fluid matrix composition, a layer comprising the resin in the fluid state that contains the polytetrafluoroethylene particles, and
  jointly curing the resin in the fluid state and the fluid matrix composition in order to form the abrasion-resistant area and to obtain the composite material part.

Alternatively and according to a second embodiment, the method is a method for manufacturing a part such as described above, comprising at least:
  forming, on the surface of a fibrous structure, a layer comprising the resin in the fluid state that contains the polytetrafluoroethylene particles,
  introducing a fluid matrix composition into pores of said fibrous structure, and
  jointly curing the resin in the fluid state and the introduced fluid matrix composition in order to form the abrasion-resistant area and to obtain the composite material part.

In the two method cases that have just been described, the joint curing can be carried out by joint cross-linking (co-cross-linking) of the resin and the matrix composition. This is the case when the resin and the matrix composition are thermosetting. The joint curing can then be carried out by joint solidification without cross-linking of the resin and the matrix composition. This is the case when the resin and the matrix composition are thermoplastic.

BRIEF DESCRIPTION OF THE FIGURES

FIG. 1 schematically illustrates a cross-section of an exemplary part according to the invention.

FIG. 2 schematically illustrates a cross-section of an exemplary assembly according to the invention.

FIG. 3 illustrates the product obtained after a first step of a first exemplary manufacturing method of a part according to the invention.

FIG. 4 illustrates the product obtained after a second step of a first exemplary manufacturing method of a part according to the invention.

FIG. 5 illustrates the product obtained after a first step of a second exemplary manufacturing method of a part according to the invention.

FIG. 6 illustrates the product obtained after a second step of a second exemplary manufacturing method of a part according to the invention.

FIG. 7 illustrates the product obtained after a first step of a third is exemplary manufacturing method of a part according to the invention.

FIG. 8 illustrates the product obtained after a second step of a third exemplary manufacturing method of a part according to the invention.

FIG. 9 illustrates the product obtained after a third step of a third exemplary manufacturing method of a part according to the invention.

FIG. 10 is a comparative test result showing the differences in terms of coefficient of dynamic friction between a part according to the invention and parts outside of the invention.

FIG. 11 is a comparative test result showing the differences in terms of coefficient of dynamic friction between a part according to the invention and parts outside of the invention.

FIG. 12 is a comparative test result showing the differences in terms of wear volume after a friction test between a part according to the invention and parts not according to the invention.

DESCRIPTION OF THE EMBODIMENTS

FIG. 1 shows an example of a part 1 according to the invention. The part 1 is made of organic matrix composite material and comprises a fibrous reinforcement densified by the organic matrix. The organic matrix is present in the pores of the fibrous reinforcement and coats and binds the fibres of this reinforcement. The joining of the fibrous reinforcement and the organic matrix forms an organic matrix composite material represented by the symbol 10 in FIGS. 1 to 4.

The fibrous reinforcement can have various structures. By way of example, the fibrous reinforcement can be formed by a stack of fibrous textures, such as two-dimensional fabrics or unidirectional plies, or by a fabric obtained by three-dimensional weaving. The fibres forming the fibrous reinforcement can be carbon fibres, fibres of a ceramic material different from carbon, such as silicon carbide or alumina, glass fibres or polymer fibres.

The organic matrix of the part 1 can be a thermoplastic polymer in the solid state or a thermosetting polymer in the polymerised and solid state. By way of example, the organic matrix can be an epoxy matrix, a polyurethane matrix, a polyamide matrix, a polyetherimide matrix (PEI) or a polyether ether ketone matrix (PEEK).

The part 1 has, on its surface S, an abrasion-resistant area 20 which comprises a resin 24 that contains polytetrafluoroethylene particles 22. In general, in the figures, the dimensions of this area 20 have been exaggerated for reasons of readability. In the following, for reasons of conciseness and unless otherwise mentioned, the expression "polytetrafluoroethylene particles" is designated by "PTFE particles" or "particles", and the expression "abrasion-resistant area" is designated by "area". The resin 24 constitutes a solid matrix that contains the particles 22. The area 20 can have a coefficient of dynamic friction less than or equal to 0.1, for example less than or equal to 0.06. The coefficient of dynamic friction can be measured by the test method of alternating friction under load.

The area 20 is a surface portion of the part 1 located between the outer surface S of the part 1 and the fibrous reinforcement thereof. The area 20 can be in contact with the fibres of the fibrous reinforcement of the part 1. In particular, particles 22 can be in contact with the fibres of the fibrous reinforcement and/or inserted between these fibres. Alternatively, the area 20 can be separated from the fibres of the fibrous reinforcement by the organic matrix of the part 1.

The thickness $e_{10}$ of the area 20 can be less than or equal to 0.5 mm, for example between 0.01 mm and 0.3 mm.

The area 20 defines the outer surface S of the part 1 and is intended to be in contact and to rub with a second part, separate from the part 1, during use. FIG. 2 illustrates this aspect where a second part 2 is in contact with the area 20 of the part 1. The part 1 and the second part 2 are intended to be in frictional contact (indicated by the arrows F) during use. It is noted that the frictional surface of the second part 2 which, in contact with the area 20, may or may not have an abrasion-resistant area of the same type as the area 20.

In the example of FIG. 1, the PTFE particles 22 are selectively located in the area 20, in other words are only present at the surface of the part 1, and are not present in the entirety of the composite material 10 covered by the area 20. However, it does not depart from the scope of the invention if the particles 22 are present at the surface of the part 1 but also in the entire volume of the composite material 10 covered by the area 20. The PTFE particles can thus be, according to one example, incorporated in the organic matrix of the part 1.

The resin 24 can be thermoplastic in the solid state or thermosetting in the polymerised and solid state. The resin 24 can be an organic resin. The resin 24 can be identical to or different from the organic matrix. By way of example, the resin 24 can be an epoxy resin, a polyurethane resin, a polyamide resin, a polyetherimide resin or a polyether ether ketone resin.

The mass content of PTFE particles in the area 20 can be greater than or equal to 5%, for example greater than or equal to 10%. The mass content of PTFE particles in the area 20 can be between 5% and 65%, for example between 10% and 60%. The median size of the PTFE particles can be greater than or equal to 0.1 µm, for example greater than or equal to 0.5 µm. The median size of the PTFE particles can be less than or equal to 50 µm, for example less than or equal to 10 µm, for example less than or equal to 5 µm, for example less than or equal to 2 µm. The median size of the PTFE particles can be between 0.1 µm and 50 µm, for example between 1 µm and 50 µm or between 0.1 µm and 10 µm, for example between 1 µm and 10 µm, or between 0.1 µm and 5 µm, for example between 1 µm and 5 µm, or again between 0.1 µm and 2 µm, for example between 1 µm and 2 µm.

The PTFE particles can be in the form of grains, fibrils or bundles of fibrils. In the form of fibrils or bundles, the greatest length can reach 0.05 mm.

By way of example, usable PTFE particles can include the PTFE particles (median particle diameter of 1 micrometre) marketed under reference 430935-100g by Sigma-Aldrich.

The mass content of resin in the area 20 can be greater than or equal to 35%, for example greater than or equal to 40%. The mass content of resin in the area 20 can be between 35% and 95%, for example between 35% and 90% or between 40% and 95%, for example between 40% and 90%.

An example of a structure of a part according to the invention has just been described and, now, several manufacturing methods will be described in conjunction with FIGS. 3 to 9.

FIGS. 3 and 4 illustrate the products obtained during two steps of a first exemplary is manufacturing method according to the invention. In this example, the area 20 is formed on a substrate 10 made of organic matrix composite material, the manufacture of which has been completed beforehand. The organic matrix of the substrate 10 has been cured beforehand. The organic matrix of the substrate 10 is in the polymerised state in the case of a thermosetting matrix. This variant can, for example, be implemented in the context of a repair of the substrate 10 having undergone an abrasion with the second part 2 during its use or in the context of the manufacture of a part intended for first use (part in new state).

Firstly, the product illustrated in FIG. 3 is formed, which has the substrate 10 made of organic matrix composite material and a layer comprising the resin 23 in the fluid state that contains the PTFE particles 22, this layer being present on the surface S1 of the substrate 10. This layer can be in contact with the surface S1 of the substrate 10. This layer, comprising the fluid resin 23 and the particles 22, can be formed in various ways.

According to one example, the resin 23 can be directly deposited on the surface S1 in the fluid state with or without the particles 22. Thus, the resin 23 in the fluid state comprising the particles 22 in a mixture can be directly deposited on the surface S1 of the substrate 10, or the resin 23 in the fluid state can be first deposited on the substrate 10 and then the particles 22, or firstly the particles 22 then the resin 23 in the fluid state.

According to an alternative, the resin can be deposited in solid form on the surface S1, for example in the form of a film comprising the particles 22 or again in the form of a powder mixture comprising resin particles and the particles 22. In the case where the resin is deposited in the solid state on the surface S1, a step of fluidising this resin deposited on the substrate 10 is carried out, for example by heating, in order to obtain the product illustrated in FIG. 3. Before forming the layer comprising the fluid resin 23 and the particles 22, a preliminary treatment of the surface of the substrate 10 can be performed, for example by sanding and/or sandblasting (plasma, corona, laser, etc.). This preliminary surface treatment can lead to exposing, at the surface, of some fibres of the fibrous reinforcement of the substrate 10, such that the fluid resin 23 and the particles 22 then come into contact with these exposed fibres.

In a second step, the curing of the fluid resin 23 is carried out. This curing can be carried out by cooling the product of FIG. 3, thus enabling the resin to be frozen when it is a thermoplastic resin, or by polymerisation of the resin 23 when a thermosetting resin is involved. This polymerisation can be activated by heating. After this curing, the area 20 is formed and the composite material part as illustrated in FIG. 4 is obtained. The adhesion of the area 20 to the underlying substrate 10 can be carried out by bonding by an adhesive deposited beforehand on the surface of the substrate 10 and/or by penetration of the fluid resin 23 into the surface pores of the substrate, thus forming a plurality of anchoring points. This adhesion can also be carried out by local melting of the underlying substrate followed by cooling, thus enabling joint freezing of substrate 10 and area 20, in particular in the case of a thermoplastic organic matrix.

It is also noted that it is possible to carry out a step of compacting the fluid resin 23 before the end of its curing in order to obtain the desired dimensions for the area 20 and the part 1 to be obtained. This compacting step makes it possible, as illustrated, to pass from the layer comprising the fluid resin 23 of thickness $e_1$ as illustrated in FIG. 3, to the area 20 of thickness $e_{10}$, less than $e_1$, for example less than or equal to 90% of $e_1$, as illustrated in FIG. 4.

The case of FIGS. 3 and 4 which has just been described concerns the manufacture of the part by forming the area 20 on a substrate made of organic matrix composite material, the manufacture of which has been completed beforehand. The case where the resin and the particles are deposited before completing the manufacture of the organic matrix composite material will now be described, in conjunction with FIGS. 5 to 9.

Thus, FIGS. 5 and 6 illustrate a second exemplary method for manufacturing a part according to the invention. This example involves firstly forming, on the surface S2 of a fibrous structure pre-impregnated with a fluid matrix composition 40, a layer comprising the fluid resin 23 that contains the particles 22. The fibrous structure is intended to form the fibrous reinforcement of the composite material part to be obtained. The matrix composition 40 is intended to form the organic matrix of the composite material part to be obtained. In the illustrated example, the fibre structure is formed by a stack of fibrous plies 30 impregnated by the matrix composition 40 which can be a thermoplastic or thermosetting organic polymer. It is alternatively possible to use a fibrous structure formed by three-dimensional weaving.

In a similar way to that indicated in conjunction with FIGS. 3 and 4, the resin 23 and the particles 22 can be deposited directly, in a mixture or separately, and in the fluid state or solid state.

A thermal treatment of the product of FIG. 5 can then be carried out so as to co-polymerise the matrix composition 40 and the resin 23 (in the case of two thermosetting polymers) in order to obtain the part comprising an organic matrix composite material 110 that has, on its surface S, the area 20 (FIG. 6). According to an alternative, in the case of thermoplastic polymers, a cooling can be performed in order to jointly cure the resin 23 and the matrix composition 40 and to obtain the composite material part.

As indicated above, a compacting can be carried out before the end of the joint curing and thus reduce the thickness of the area 20 to a thickness $e_{10}$ less than the thickness $e_1$ of the layer comprising the fluid resin 23. The compacting can make it possible to obtain an organic matrix composite material 110 having a thickness $e_{20}$ which is a less than the thickness $e_2$ of the fibrous structure impregnated with matrix composition 40, for example less than or equal to 90% of $e_2$.

The invention is not however limited to the forming of a layer of fluid resin on a structure pre-impregnated with a matrix composition. Indeed, the manufacturing alternative of FIGS. 7 to 9 begins with the forming of the layer comprising the fluid resin 23 and the particles 22 on the surface S3 of a dry fibrous structure (non pre-impregnated). After forming this layer, the fluid matrix composition 40 is introduced into the fibrous structure. It should be noted that it is possible to carry out compacting before or after this introduction of matrix composition 40. The introduction of the matrix composition 40 can be carried out by injection or infusion. The joint curing of the matrix composition 40 and the resin 23 is then performed as described above, by co-polymerisation or joint cooling.

The features which have been described above in conjunction with the part of FIG. 1 applies to the parts obtained in the various manufacturing examples described.

The performance of the part according to the invention will now be described in conjunction with FIGS. 10 to 12. These figures provide results of comparative tests between a part according to the invention and parts outside of the invention. The parts evaluated were parts made of organic matrix composite material having, on their surface, a resin that contains particles of different types at a level of more than 20% by mass (between 30-60% by mass in the surface resin layer). The particles contained have a median size of approximately 1 μm. In these figures, "R" designates a carbon/epoxy composite not having particles at its surface and "1" designates the results for the part according to the invention having PTFE particles at its surface. References "2" to "5" are composites with various PTFE particles at their surface.

FIG. 10 presents an experimental result showing the change over time in the dynamic friction during the test carried out. The test carried out consists of alternate movements under constant compressive force.

It can be seen that, during the friction test, the part according to the invention comprising the PTFE particles exhibits a coefficient of dynamic friction that is very much lower than that of the other composite material parts tested. It appears in FIG. 11 that the part according to the invention has an average coefficient of dynamic friction over the test close to 0.05, this is very much lower than the average coefficient of dynamic friction of the other parts evaluated, which is greater than 0.3. FIG. 12 illustrates the result obtained at the end of the test in terms of wear of the surfaces in frictional contact of the evaluated products. It can be seen that the part having the smallest wear volume, corrected for the volume deformed by compression during the tests, is the part according to the invention.

The expression "between . . . and . . . " should be understood as including the limits.

The invention claimed is:

1. An assembly comprising a first part and a second part separate from the first part, the first and second parts being intended to be in frictional contact, the first part being made of an organic matrix composite material that has, on a surface of said first part, an abrasion-resistant area comprising a resin that contains polytetrafluoroethylene particles, the polytetrafluoroethylene particles being only present at the surface of the first part, and the second part being made of an organic matrix composite material and being in contact with the abrasion-resistant area of the first part.

2. The assembly according to claim 1, wherein the first part has a mass content of polytetrafluoroethylene particles in the abrasion-resistant area between 5% and 65%.

3. The assembly according to claim 2, wherein the first part has a mass content of polytetrafluoroethylene particles in the abrasion-resistant area between 10% and 60%.

4. The assembly according to claim 1, wherein the first part has a median size of polytetrafluoroethylene particles between 0.1 μm and 50 μm.

5. The assembly according to claim 4, wherein the first part has a median size of polytetrafluoroethylene particles between 0.5 μm and 50 μm.

6. The assembly according to claim 1, wherein the first part is a turbomachine part.

7. The assembly according to claim 1, wherein the second part has, on a surface of said second part, a second abrasion-resistant area comprising a second resin that contains second polytetrafluoroethylene particles, the abrasion-resistant area of the first part being in contact with the second abrasion-resistant area.

8. A turbomachine comprising an assembly according to claim 1.

9. A method for manufacturing an assembly according to claim 1, comprising:
forming, on a surface of a substrate made of organic matrix composite material, a layer comprising the resin in the fluid state and the polytetrafluoroethylene particles,
curing the resin in the fluid state on the substrate to form the abrasion-resistant area and to obtain the first part made of composite material, and
placing the abrasion-resistant area of the first part, obtained in this way, in contact with the second part.

10. A method for manufacturing an assembly according to claim 1, comprising:
forming, on a surface of a fibrous structure pre-impregnated with a fluid matrix composition, a layer comprising the resin in the fluid state that contains the polytetrafluoroethylene particles, and
jointly curing the resin in the fluid state and the fluid matrix composition in order to form the abrasion-resistant area and to obtain the first part made of composite material, and
placing the abrasion-resistant area of the first part, obtained in this way, in contact with the second part.

11. A method for manufacturing an assembly according to claim 1, comprising:
forming, on a surface of a fibrous structure, a layer comprising the resin in the fluid state that contains the polytetrafluoroethylene particles,
introducing a fluid matrix composition into pores of said fibrous structure,
jointly curing the resin in the fluid state and the introduced fluid matrix composition in order to form the abrasion-resistant area and to obtain the first part made of composite material, and
placing the abrasion-resistant area of the first part, obtained in this way, in contact with the second part.

* * * * *